United States Patent [19]

Hamm

[11] 3,850,608

[45] Nov. 26, 1974

[54] METHOD OF PLANT GROWTH REGULATION

[75] Inventor: Philip C. Hamm, Glendale, Mo.

[73] Assignee: Monsanto Company, St. Louis, Mo.

[22] Filed: Oct. 30, 1972

[21] Appl. No.: 302,387

Related U.S. Application Data

[63] Continuation-in-part of Ser. No. 41,108, May 27, 1970, abandoned, which is a continuation-in-part of Ser. No. 769,409, Oct. 21, 1968, Pat. No. 3,556,762, and a continuation-in-part of Ser. No. 668,208, Sept. 15, 1967, abandoned, which is a continuation-in-part of Ser. No. 567,093, July 22, 1966, abandoned.

[52] U.S. Cl. .......................................... 71/76, 71/86

[51] Int. Cl. ............................................. A01n 9/36
[58] Field of Search ................................... 71/86, 76

[56] References Cited
UNITED STATES PATENTS
3,455,675   7/1969   Inani ...................................... 71/86

Primary Examiner—James O. Thomas, Jr.
Attorney, Agent, or Firm—Arnold H. Cole; Donald W. Peterson; Neal E. Willis

[57] ABSTRACT

The use of certain phosphonomethylimino acetic acid compounds for regulating the natural growth or development of plants, particularly turfgrasses.

32 Claims, No Drawings

METHOD OF PLANT GROWTH REGULATION

This application is a continuation-in-part of application Ser. No. 41,108, filed May 27, 1970, now abandoned which is a continuation-in-part of application Ser. No. 769,409, filed Oct. 21, 1968, now U.S. Pat. No. 3,556,762. The last-named application is a continuation-in-part of application Ser. No. 668,208, filed Sept. 15, 1967, now abandoned, which is a continuation-in-part of application Ser. No. 567,093, filed July 22, 1966, now abandoned.

This invention relates to a method for regulating the natural growth or development of plants by means of chemical treatment. As employed herein, the term "natural growth or development" designates the normal life cycle of the plant in accordance with its genetics and its environment, in the absence of artificial, external influences. More particularly, this invention is concerned with a method wherein turfgrasses are treated with a chemical substance which serves to retard or reduce the rate of turfgrass growth. Such a treatment can also serve to retard or reduce the formation of seedheads and seedhead stalk elongation.

U.S. Pat. No. 3,556,762 describes the use of compounds of this invention to perform a different regulatory function, i.e., to increase the deposition of carbohydrates in treated plants. In addition, U.S. Pat. No. 3,455,675 describes the use of compounds of this invention as herbicides in a procedure for inhibiting or destroying unwanted plants. It should be understood, however, that the regulation of natural growth or development discussed herein does not include herbicidal or killing action, and that the turfgrasses treated in accordance herewith are not unwanted plants.

Although lethal amounts of the materials disclosed herein might be employed to obtain destruction or total inhibition of certain plants, it is contemplated here to employ only such amounts of said materials as will serve to effectively regulate the natural growth or development in the desired manner. As long understood and well recognized by those skilled in the art, such effective plant regulating amounts will vary, not only with the particular material selected for treatment, but also with the regulatory effect to be achieved, the species of plant being treated and its stage of development, and whether a permanent or transient regulating effect is sought. Other factors which may bear upon the determination of an effective plant regulating amount include the plant growth medium, the manner in which the treatment is to be applied, and weather conditions such as temperature and rainfall.

The term "turfgrass" is generally considered as encompassing a variety of specialized grasses which are employed in the development and/or management of certain areas for specific purposes, such as utility, beautification and recreation. The use of a chemical treatment to reduce or retard the natural growth or development of turfgrass provides many advantages. Among the areas in which turfgrasses are most frequently used are roadbanks and medians which parallel long stretches of our highway system, the large grassy areas of golf courses and parks, the grounds which surround large educational or industrial institutions and, of course, the lawn of the homeowner. In all of such areas, it is readily apparent that a chemical treatment which serves to reduce or retard the rate of grass growth is highly desirable since it will serve to minimize the time and costs expended on maintenance. Such a treatment will also provide enhanced appearance by promoting more grass height uniformity and by suppressing unsightly seedhead development.

In accordance with this invention, the desired retardation or reduction of the rate of growth of turfgrass, and the retardation or reduction of the formation of seedheads and seedhead stalk elongation, is achieved by applying to turfgrass an effective amount of at least one phosphonomethylimino acetic acid compound of the formula

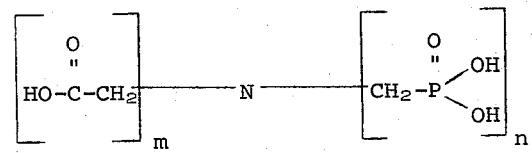

wherein $m$ and $n$ are unlike integers selected from 1 and 2, or the alkali metal, ammonium and lower alkyl ammonium salts of such compounds. As employed herein, the term "lower alkyl" designates the saturated aliphatic hydrocarbon radicals having up to 4 carbon atoms in a straight or branched chain. In practicing the method of this invention, it is preferred to employ the free acids of the above formula and the ammonium ($NH_4$) salts thereof.

As already indicated herein, the phosphonomethylimino acetic acids and salts of this invention are known in the art. The preparation of such acids and salts is described and exemplified in U.S. Pat. Nos. 3,288,846 and 3,455,675.

The specific examples which follow are presented as merely illustrative, non-limiting demonstrations of the manner in which the various compounds disclosed may be employed to achieve the useful and unexpected results when applied to turfgrasses.

EXAMPLE I

In this test, N,N-bis(phosphonomethyl) glycine (Compound A) and ammonium salt of N-phosphonomethylimino diacetic acid (2.5 moles of ammonia per mole of acid) (Compound B) were applied to a number of plots of various turfgrasses. Each compound was applied by spraying at several rates. Turfgrasses in the plots were mature at the time of treatment, and the average height was about 2.25 inch. Observations were made 12 days after treatments, and the results were compared with untreated control plots. The percent reduction or retardation of vegetative growth is set forth in the following table. Numbers in parentheses indicate the percent of grass discoloration, and the absence of such a number indicates no difference in color as against the untreated controls.

EXAMPLE II

In this test, each of the compounds used in Example I was applied by spraying to elongated strips (0.1 to 0.5 miles) of pensacola Bahiagrass along an interstate highway. Treatments were at rates of 3.0 or 3.5 lbs/acre on grass from 3-6 inches tall. After 70 days, the adjacent untreated control areas had been mowed twice and had grass from 9-11 inches tall with numerous seedheads 1.5-2 inches high. The strips treated with Compound A has not been moved, and the grass was 5-7 inches tall with only occasional seedheads above the level of the

% REDUCTION OF VEGETATIVE GROWTH
(% DISCOLORATION)

| Turfgrass | Cmpd. A, lbs/acre | | | Cmpd. B, lbs/acre | | |
| --- | --- | --- | --- | --- | --- | --- |
| | 2 | 3 | 4 | 2 | 3 | 4 |
| Pensacola Bahia | 25 | 30 | 70 | 50 | 70 | 90 |
| Argentine Bahia | 25 | 30 | 70 | 50 | 70 | 90 |
| Bitter Blue St. Augustine | 15 | 25 | 60 | 60 | 80(15) | 90(10) |
| Bitter Blue St. Augustine | 20 | 40 | 80 | 75 | 85(15) | 95(20) |
| 1081 St. Augustine | 15 | 25 | 60 | 65 | 85(15) | 95(20) |
| Common Centipede | 20 | 30 | 70 | 30 | 60 | 80 |
| Tifgreen Bermuda | 25 | 60 | 80(10) | 30 | 60 | 80 |
| Tifway Bermuda | 25 | 60 | 80(10) | 35 | 70 | 90 | vegetation in the area. Reduction of grass height was about the same in the strips treated with Compound B, and the reduction of seedhead stalk elongation was slightly better than with Compound A. Although there was some grass discloration in the treated strips in the first two weeks, grass color after 70 days was the same as the untreated control. The effectiveness of the treatments was found to be somewhat lower in observations made after an additional 30 days.

A similar test with Compound B was made at a rate of 2.5 lbs/acre on 5–6 inches high Pensacola Bahiagrass which has been mowed 4 days prior to treatment. After about 60 days, the untreated control area had been moved twice, and the grass was 8–14 inches high with seedheads 17–22 inches at a density of about 6 per square foot. Grass in the treated strips had not been mowed and was 6–8 inches high. The seedhead count in the treated area was about 1 per 15–25 square foot, and even where present, seedheads were reduced to an average height of about 12 inches.

EXAMPLE III

In this test, each of the compounds used in Example I was applied by spraying to areas adjacent to certain highways. Each treatment included a quantity of a commercial herbicide used to control broadleaf weeds, and all treated areas were mowed on the day prior to application. The turfgrass in these areas was tall fescue, and the stands were of various ages, all being at least one year old.

Compound A was applied at a rate of 3.5 lbs/acre and only slight regrowth was observed 21 days after treatment. At that time, there was a slight greenish-brown color noted, and seedhead control was about 85–90 percent. At 58 days after treatment, the untreated control area had been mowed twice and was ready to be cut again. Seedheads in the control area were 22–30 inches high with a density of about 20 per square foot. The treated grass had not been mowed and was also ready to be cut. Treated grass was slightly less green than the control, seedheads were 22–28 inches high, and seedhead density was about 10 per square foot.

Treatments with Compound B were at 3.0 lbs/acre, and no regrowth was observed after 21 days. Seedhead control was almost complete while the untreated control areas had seedheads 8–10 inches high. Browning of the treated grass was noted. At 58 days after treatment, the control was the same as from Compound A, and the treated areas had only an occasional seedhead 10–14 inches high. The browining noted earlier had improved to a level where color was equal to the untreated control. The treated areas had not been mowed and grass was about 5–9 inches high as compared to the control areas being ready for a third mowing. Further observations after 101 days showed continued good overall control of grass height in the treated area while the untreated control had been mowed four times. Comparisons of the results on the different age treated areas appeared to indicate that both grass color and reduction of vegetative growth are better in more mature stands of the turfgrass.

EXAMPLE IV

In this test, each of the compounds used in Example I was applied by spraying to plots containing stands of either tall fescue of Kentucky bluegrass turf. Grass was mowed to 1.75 inches just prior to each application. The bluegrass plots were pretreated with nitrogen and irrigated regularly, but this was not done with the fescue plots. One group of plots was treated in early spring, and a second group of plots was treated about 5 weeks later. Some of the first group of plots were given a repeat treatment at the later date. There was no significant loss of color when the treated turfgrass was compared to mowed adjacent areas, and observations of grass height were as set forth in the following tables. It should be noted that height measurements were made on a weekly basis, although only the data for the third and fifth weeks are tabulated herein.

EARLY TREATMENT
(HEIGHT IN INCHES)

| | Tall Fescue | | Kentucky Bluegrass | |
| --- | --- | --- | --- | --- |
| | 3rd week | 5th week | 3rd week | 5th week |
| Untreated control | 11.0 | 12.8 | 6.9 | 10.6 |
| Compound A - 2 lbs/acre | 8.2 | 10.4 | 3.9 | 6.3 |
| Compound A - 4 lbs/acre | 5.8 | 8.2 | 3.7 | 5.4 |
| Compound B - 2 lbs/acre | 6.1 | 7.8 | 4.4 | 6.8 |
| Compound B - 4 lbs/acre | 5.2 | 7.2 | 3.5 | 4.9 |

LATER TREATMENT
(HEIGHT IN INCHES)

| | Tall Fescue | | Kentucky Bluegrass | |
| --- | --- | --- | --- | --- |
| | 3rd week | 5th week | 3rd week | 5th week |
| Untreated control | 5.8 | 7.8 | 8.1 | 9.8 |
| Compound A - 2 lbs/acre | 5.7 | 7.0 | 6.9 | 9.6 |
| Compound A - 4 lbs/acre | 4.4 | 6.1 | 7.0 | 9.1 |
| Compound B - 2 lbs/acre | 5.1 | 6.3 | 7.4 | 9.9 |
| Compound B - 4 lbs/acre | 4.7 | 5.9 | 6.0 | 8.3 |

EARLY AND LATER TREATMENTS—Continued
(HEIGHT IN INCHES)*

|  | Tall Fescue | | Kentucky Bluegrass | |
|---|---|---|---|---|
|  | 3rd week | 5th week | 3rd week | 5th week |
| Untreated Control | 7.3 | 8.5 | 8.0 | 9.7 |
| Compound A - 2 lbs/acre | 6.9 | 8.2 | 7.0 | 9.2 |
| Compound A - 4 lbs/acre | 6.0 | 7.5 | 6.4 | 8.6 |
| Compound B - 2 lbs/acre | 5.9 | 7.5 | 6.6 | 9.1 |
| Compound B - 4 lbs/acre | 5.6 | 7.2 | 5.9 | 8.5 |

* Observation dates are after later treatment.

EXAMPLE V

In this test, each of the compounds used in Example I was applied by spraying at various rates to irrigated plots of a mixture of bluegrass. The plots were mowed two days before application, and visual observations of grass height and/or color were made at 1, 2 and 3 weeks after treatment, which was in mid-summer. The plots were re-mowed after the first observation.

Both grass color and vegetative growth retardation were rated on a scale of 1 to 9 with the lower numbers indicating better color and retardation. The ratings tabulated below are averages of all controls and replicated treatments.

EXAMPLE VII

In this test, Compound B of Example I was applied by spraying to areas containing bluegrass turf adjacent to certain highways. The grass was 2 inches high at the time of treatment, having been mowed 3-4 days earlier, and the rates of application were 2 and 3 lbs/acre. Observations made 53 days later showed few seedheads in the treated areas as against many seedheads in the control area. However, it was also noted that the treated turfgrass was severely injured or dead. It is believed that the very low vegetative height at the time of treatment, and a severe dry spell in the second and third weeks after treatment, were causative factors for the undesirable grass injury.

|  | 1 week | | 2 weeks | | 3 weeks |
|---|---|---|---|---|---|
|  | Color | Retardation | Color | Retardation | Color |
| Untreated Control | 1.5 | 9.0 | — | — | 1.3 |
| Cmpd. A - 1 lb/acre | 2.0 | 5.0 | 1.5 | 8.5 | 1.5 |
| Cmpd. A - 2.5 lbs/acre | 2.5 | 6.5 | 2.0 | 3.5 | 1.5 |
| Cmpd. A - 5 lbs/acre | 2.0 | 6.0 | 2.5 | 2.0 | 3.5 |
| Cmpd. A - 10 lbs/acre | 3.5 | 3.0 | 3.0 | 1.0 | 8.0 |
| Cmpd. B - 0.5 lbs/acre | 2.0 | 6.0 | 2.0 | 4.0 | 2.5 |
| Cmpd. B - 2 lbs/acre | 1.5 | 5.0 | 2.5 | 1.0 | 6.0 |
| Cmpd. B - 5 lbs/acre | 1.5 | 5.0 | 3.0 | 2.5 | 8.0 |
| Cmpd. B - 10 lbs/acre | 2.0 | 4.0 | 3.5 | 1.0 | 9.0 |

EXAMPLES VI

In this test, each of the compounds used in Example I was applied by spraying to plots containing either common fescue or Park Kentucky bluegrass turf. Applications were made in late spring at rates of 1, 3 and 5 lbs/acre, and observations were made about a month after treatment by comparison with the untreated control area. In the bluegrass plots none of the treatments with either compound caused any color change. At the 1 pound rate, each compound caused about 10 percent reduction or retardation of vegetative growth but did not effect seedhead production. At the 3 and 5 pounds rates, vegetative growth was reduced 20-30 percent and 50-60 percent respectively with either compound. The lesser of these rates caused slight seedhead suppression, while the higher rate greatly reduced seedhead formation.

In the fescue plots, none of the treatments with either compound caused any color change. With Compound A at 1 pound, there was little effect on grass height or seedheads; at 3 pounds, grass height was reduced 10-20 percent with a corresponding suppression of seedheads, and at 5 pounds, grass height was reduced 40-50 percent with 75 percent or more seedhead suppression. At 1 pound of compound B, there was slight height reduction and seedhead suppression. Height reduction increased to 10-20 percent and 30 percent at the 3 and 5 pounds rates, respectively, while seedhead suppression at these rates was 40-50 percent and 50-70 percent.

EXAMPLE VIII

In this test, Compound A of Example I and N-phosphonomethylimino diacetic acid (Compound C) were applied by spraying to plots containing either tall fescue or Kentucky bluegrass turf. The first test area contained 1.5 year old tall fescue turf which had been mowed to a uniform height of 7 cm. just prior to spraying in the fall of the year. Periodic height measurements and color evaluations were made. In addition, portions of the treated and control areas were harvested and a calculation dry weight yield was made. Data obtained are tabulated and represent mean values. Color values are on a scale of 0-10 where the higher figures indicate best color. Stand density was calculated the following spring as the number of sections out of 25 in a square meter quadrat filled with at least one-half tall fescue.

The second test area contained mixed varieties of Kentucky bluegrass which had been mowed to a unifom height of 5 cm. just prior to spraying in the fall with Compound C. About a week after spraying, one part of this test area was fertilized, and each part was then observed periodically in substantially the same manner as described above. In the stand density calculations, quadrats had to be filled with at least three-quarters bluegrass, and there were two spring observations of height and color about 17 days apart.

The results noted in the fertilized and unfertilized parts of the test area were as hereinafter tabulated.

The third test area contained a 15 year old stand of tall fescue turf which had been mowed to a uniform

| | Days After Treatment | Control | Compound A | | | Compound C | | | |
|---|---|---|---|---|---|---|---|---|---|
| lbs/acre | | — | 2 | 4 | 8 | 1 | 2 | 3 | 4 |
| Height (cm.) | 7 | 13.3 | 9.7 | 9.0 | 9.4 | 10.5 | 9.2 | 9.5 | 9.2 |
| | 14 | 13.8 | 8.5 | 7.2 | 6.8 | 8.2 | 7.7 | 6.9 | 7.0 |
| | 21 | 17.0 | 7.7 | 7.2 | 7.0 | 8.6 | 7.7 | 7.7 | 7.3 |
| | 28 | 15.2 | 7.8 | 7.2 | 6.5 | 8.9 | 7.2 | 7.1 | 7.2 |
| | 36 | 18.2 | 11.2 | 9.9 | 8.3 | 13.3 | 11.3 | 8.8 | 9.0 |
| | 42 | 16.5 | 11.7 | 9.5 | 9.2 | 13.8 | 10.9 | 9.6 | 9.2 |
| | 49 | 16.2 | 13.4 | 12.5 | 10.7 | 14.0 | 14.3 | 11.8 | 11.1 |
| | spring | 15.19 | 11.31 | 10.5 | 8.13 | 11.5 | 11.44 | 8.75 | 8.81 |
| Yield gm/7.5 m$^2$) | 28 | 433.8 | 52.0 | 48.3 | 45.8 | 91.5 | 64.5 | 46.3 | 64.8 |
| Color (0–10) | 37 | 10.0 | 7.3 | 6.8 | 5.3 | 7.8 | 7.0 | 6.3 | 5.8 |
| | 56 | 10.0 | 8.5 | 7.0 | 4.5 | 9.0 | 7.0 | 5.8 | 5.3 |
| | spring | 8.75 | 9.0 | 8.5 | 8.25 | 9.25 | 9.0 | 8.5 | 8.0 |
| Stand Density | spring | 24.63 | 23.88 | 22.0 | 13.5 | 23.25 | 21.75 | 18.5 | 14.25 |

| | Days After Treating | Compound C (Unfertilized) | | | | | Compound C (Fertilized) | | | | |
|---|---|---|---|---|---|---|---|---|---|---|---|
| lbs/acre | | 0 | 1 | 2 | 3 | 4 | 0 | 1 | 2 | 3 | 4 |
| Height (cm.) | 7 | 7.8 | 6.8 | 6.7 | 6.6 | 7.1 | — | — | — | — | — |
| | 14 | 9.4 | 6.5 | 6.0 | 6.1 | 6.5 | 10.3 | 6.5 | 5.9 | 6.0 | 6.4 |
| | 21 | 9.3 | 6.1 | 6.0 | 5.9 | 5.8 | 12.2 | 6.8 | 5.9 | 5.7 | 5.9 |
| | 28 | 10.3 | 7.0 | 6.1 | 6.0 | 6.0 | 14.8 | 8.1 | 6.1 | 6.1 | 6.0 |
| | 36 | 10.9 | 7.7 | 6.8 | 6.4 | 6.5 | 15.5 | 10.4 | 7.7 | 7.3 | 7.4 |
| | 42 | 11.8 | 9.0 | 6.8 | 7.1 | 7.2 | 16.4 | 13.2 | 9.1 | 9.0 | 9.0 |
| | 49 | 11.7 | 9.7 | 9.2 | 8.7 | 8.2 | 16.5 | 15.1 | 11.7 | 11.2 | 10.9 |
| | spring$^1$ | 7.4 | 5.6 | 5.1 | 5.5 | 5.4 | 12.1 | 9.8 | 7.6 | 7.3 | 7.1 |
| | spring$^2$ | 9.4 | 8.1 | 7.6 | 7.3 | 7.0 | 16.4 | 13.8 | 9.6 | 9.7 | 10.1 |
| Yield (gm/4.2 m.$^2$) | 33 | 363.8 | 168.3 | 125.5 | 137.0 | 132.0 | 668.3 | 282.5 | 158.0 | 165.0 | 148.0 |
| Color (0–10) | 19 | 9.0 | 8.0 | 7.4 | 7.0 | 7.5 | 10.0 | 7.3 | 6.3 | 6.0 | 6.5 |
| | 49 | 8.8 | 8.5 | 7.0 | 8.0 | 6.8 | 10.0 | 9.5 | 8.8 | 9.0 | 8.5 |
| | spring$^1$ | 5.0 | 6.5 | 7.0 | 7.0 | 7.75 | 7.0 | 7.5 | 7.75 | 8.0 | 8.0 |
| | spring$^2$ | 6.0 | 7.25 | 7.75 | 7.75 | 8.0 | 8.5 | 9.0 | 8.75 | 8.75 | 8.5 |
| Stand Density | spring$^1$ | 24.6 | 24.9 | 24.1 | 24.1 | 24.1 | 25.0 | 24.8 | 24.1 | 23.3 | 23.6 | height of 7 cm. just prior to spraying in the spring of the year. The area had been limed and fertilized the preceding fall, and fertilized again in the spring. Treatment was made using Compound C, and periodic observations were made of height, yield, color and numer of seedheads. The data obtained are in the following table.

The fourth test area was substantially identical to the third test area except that the fall application of lime was at a lower rate. Both Compound A and Compound C were applied to this area with the following results.

| | Days After Treating | Control | Compound C | | |
|---|---|---|---|---|---|
| lbs/acre | | | 1 | 2 | 3 |
| Height (cm.) | 9 | 15.3 | 11.5 | 10.7 | 9.7 |
| | 16 | 21.6 | 12.7 | 10.6 | 10.0 |
| | 23 | 29.6 | 16.7 | 12.4 | 11.5 |
| | 30 | 44.4 | 23.8 | 17.7 | 14.3 |
| | 37 | 50.7 | 32.9 | 22.1 | 18.3 |
| | 44 | 44.4 | 32.4 | 26.4 | 21.3 |
| | 51 | 44.7 | 35.1 | 29.2 | 26.5 |
| | 58 | 42.6 | 36.3 | 29.6 | 27.9 |
| Yield (lbs/8.0 m.$^2$) | 62 | 7.9 | 6.4 | 5.1 | 4.3 |
| Color (0–10) | 40 | 9.0 | 8.5 | 8.0 | 8.0 |
| | 58 | 8.0 | 8.8 | 8.8 | 8.3 |
| Seedheads per m.$^2$ | — | 411.3 | 216.9 | 123.1 | 100.0 |

The fifth test area contained a fertilized stand of mixed varieties of Kentucky bluegrass which had been mowed to a uniform height of 6 cm. just prior to spraying. This area received treatments with Compound A and Compound C, and it received additional fertilizer two weeks later. The following data were obtained in periodic observations.

|  | Days After Treatment | Control | Compound A | | | Compound C | | |
|---|---|---|---|---|---|---|---|---|
| lbs/acre |  | — | 1 | 2 | 4 | 1 | 2 | 4 |
| Height (cm.) | 9 | 12.9 | 11.3 | 10.3 | 8.6 | 11.2 | 10.3 | 9.2 |
|  | 16 | 18.3 | 13.8 | 10.8 | 8.3 | 12.3 | 11.1 | 9.2 |
|  | 23 | 28.2 | 22.5 | 14.5 | 8.8 | 18.1 | 13.7 | 11.3 |
|  | 30 | 36.3 | 31.1 | 22.4 | 12.8 | 26.1 | 20.1 | 15.3 |
|  | 37 | 38.7 | 28.6 | 24.8 | 17.2 | 27.7 | 23.8 | 19.1 |
|  | 44 | 38.3 | 29.8 | 24.7 | 20.5 | 28.2 | 25.2 | 21.8 |
|  | 51 | 38.7 | 32.6 | 29.0 | 24.5 | 29.6 | 27.5 | 25.3 |
|  | 58 | 36.8 | 31.1 | 27.5 | 22.5 | 31.1 | 26.5 | 24.8 |
| Yield (lbs/8.0 m.²) | 61 | 6.3 | 5.1 | 3.9 | 1.2 | 4.5 | 3.8 | 3.0 |
| Color (0–10) | 40 | 8.5 | 8.8 | 8.5 | 9.0 | 8.5 | 7.8 | 8.8 |
|  | 58 | 8.0 | 8.0 | 8.0 | 7.3 | 7.8 | 8.3 | 7.8 |
| Seedheads per m.² | 51 | 120.6 | 143.8 | 118.1 | 51.9 | 118.8 | 100.0 | 68.1 |

EXAMPLE IX

In this test, Compound A and Compound C were applied by spraying in the spring to three different areas having stands of tall fescue turf. The first area treated contained unmowed grass with an average height of 10 cm. The second area was treated 7 days later and had just been mowed to an average height of 6 cm. The third area, which was treated after an additional 17 days, was unmowed with an average height of 30 cm. Observations of grass height, color and number of seedheads were made, and the data obtained in hereinafter tabulated.

|  | Days After Treating | Control | Compound A | | Compound C | | |
|---|---|---|---|---|---|---|---|
| lbs/acre |  | — | 2 | 4 | 1 | 2 | 4 |
| Height (cm.) | 7 | 11.9 | 8.5 | 8.3 | 9.0 | 7.9 | 8.2 |
|  | 14 | 15.7 | 9.6 | 8.4 | 9.3 | 8.5 | 7.9 |
|  | 21 | 20.0 | 9.4 | 8.2 | 8.9 | 8.2 | 7.9 |
|  | 28 | 22.3 | 11.1 | 8.8 | 11.4 | 8.2 | 8.0 |
|  | 35 | 22.5 | 14.1 | 11.1 | 12.1 | 9.1 | 8.4 |
|  | 42 | 23.6 | 14.9 | 13.2 | 13.1 | 9.3 | 8.4 |
|  | 49 | 23.5 | 14.0 | 13.9 | 14.9 | 9.8 | 9.3 |
| Yield (lbs/8.9 m.²) | 49 | 5.6 | 3.8 | 3.5 | 3.4 | 2.1 | 1.6 |
| Color (0–10) | 24 | 9.3 | 6.3 | 5.8 | 6.5 | 5.8 | 5.3 |
|  | 43 | 7.3 | 6.5 | 5.8 | 6.3 | 4.3 | 3.5 |
| Seedheads per m.² | — | 70.0 | 61.3 | 63.8 | 56.3 | 105.0 | 110.0 |

|  | Days After Treating | Control | Compound A | | Compound C | | |
|---|---|---|---|---|---|---|---|
| lbs/acre |  | — | 2 | 4 | 1 | 2 | 4 |
| First Area | | | | | | | |
| Height (cm.) | 38 | 58.0 | 35.67 | 24.5 | 37.09 | 28.84 | 17.34 |
|  | 68 | 50.13 | 44.0 | 36.0 | 44.25 | 41.5 | 31.63 |
| Seedheads per m.² | 38 | 81.9 | 58.1 | 18.8 | 59.8 | 71.9 | 10.6 |
|  | 68 | 1107.75 | 465.0 | 123.75 | 182.5 | 283.75 | 92.5 |
| Color (0–10) | 67 | 8.25 | 8.75 | 9.0 | 9.0 | 9.0 | 8.75 |
| Second Area | | | | | | | |
| Height (cm.) | 31 | 55.0 | 37.5 | 28.58 | 42.17 | 30.0 | 25.34 |
|  | 46 | 51.63 | 42.13 | 43.5 | 43.25 | 38.5 | 44.0 |
| Seedheads per m.² | 31 | 153.75 | 183.75 | 117.5 | 178.75 | 155.0 | 73.75 |
|  | 45 | 1221.25 | 725.0 | 605.0 | 788.75 | 386.25 | 638.75 |
| Color (0–10) | 46 | 8.5 | 8.5 | 9.75 | 8.75 | 9.0 | 8.5 |
| Third Area | | | | | | | |
| Height (cm.) | 14 | 54.5 | 30.25 | 27.25 | 35.42 | 28.33 | 30.25 |
|  | 43 | 48.63 | 27.75 | 24.25 | 32.0 | 22.63 | 26.88 |
| Seedheads per m.² | 14 | 51.88 | 0.63 | 0.0 | 17.5 | 1.25 | 1.25 |
|  | 42 | 1097.5 | 65.0 | 22.5 | 106.25 | 16.25 | 37.5 |
| Color (0–10) | 43 | 9.0 | 7.0 | 6.5 | 7.0 | 5.25 | 5.5 |

EXAMPLE X

In this test, plots containing a wide variety of turfgrass species were sprayed with Compound C, and grass height measurements were made 8 days after application with the following results.

| TURFGRASS | LBS/ACRE | HEIGHT (cm.) |
| --- | --- | --- |
| Common Kentucky Bluegrass | 2 | 7.2 |
|  | 4 | 7.3 |
|  | Control | 14.2 |
| Merion Kentucky Bluegrass | 2 | 7.8 |
|  | 4 | 6.9 |
|  | Control | 12.4 |
| Pennstar Kentucky Bluegrass | 2 | 7.9 |
|  | 4 | 7.2 |
|  | Control | 11.1 |
| Prato Kentucky Bluegrass | 2 | 8.0 |
|  | 4 | 7.4 |
|  | Control | 13.0 |
| Kentucky Bluegrass: Newport 25% Merion 50% Park 25% | 2 | 7.5 |
|  | 4 | 7.0 |
|  | Control | 11.7 |
| N-7-16 Kentucky Bluegrass | 2 | 7.5 |
|  | 4 | 7.3 |
|  | Control | 13.3 |
| Fylking Kentucky Bluegrass | 2 | 8.0 |
|  | 4 | 7.7 |
|  | Control | 11.7 |
| Red Fescue 50% | 2 | 8.7 |
| Common Kentucky Bluegrass 50% | 4 | 7.9 |
|  | Control | 13.2 |
| Perennial Ryegrass | 2 | 8.6 |
|  | 4 | 7.4 |
|  | Control | 13.2 |
| Perennial Ryegrass 50% | 2 | 7.9 |
| Common Kentucky Bluegrass 50% | 4 | 7.2 |
|  | Control | 12.4 |
| Kentucky 31 Tall Fescue | 2 | 7.5 |
|  | 4 | 7.2 |
|  | Control | 13.2 |
| Common Bermuda | 2 | 7.1 |
|  | 4 | 6.7 |
|  | Control | 10.7 |
| U-3 Bermuda | 2 | 5.6 |
|  | 4 | 7.0 |
|  | Control | 8.4 |
| Tiffine Bermuda | 2 | 5.5 |
|  | 4 | 5.4 |
|  | Control | 7.3 |
| Kentucky 31 Tall Fescue 50% | 2 | 7.6 |
| Common Kentucky Bluegrass 50% | 4 | 7.4 |
|  | Control | 13.8 |
| Meyer Zoysia | 4 | 5.7 |
|  | Control | 7.0 |
| Midwest Zoysia | 2 | 6.1 |
|  | 4 | 6.2 |
|  | Control | 9.1 |

It should be noted that at least portions of the data in Examples VIII – X have recently been published in "Weeds, Tress and Turf," May 1972, pages 34–39, and "Crops and Soils Magazine," June–July 1972, pages 12–13.

EXAMPLE XI

In this test, a number of pots were planted in the greehouse with K-31 fescue and were grown for about 12 weeks. The compounds to be applied were formulated in acetone and water, and about 0.5 percent of a surface active agent was added. The height of the grass in each pot was measured, and treatments at the rates indicated below were made with a hand sprayer. Measurements of height were again made two weeks later, and the amount of growth during the test period was compared with that of the untreated control.

The compounds employed in this test were:
1. N-phosphonomethylimino diacetic acid
2. N,N-bis(phosphonomethyl)glycine
3. Tri(dimethylammonium) salt of N-phosphonomethylimino diacetic acid
4. Tri(sodium) salt of N-phosphonomethylimino diacetic acid
5. Tetra(dimethylammonium) salt of N,N-bis(phosphonomethyl) glycine
6. Ammonium salt of N,N-bis(phosphonomethyl)glycine — 2.5 moles of ammonia per mole of acid
7. Another tri(sodium) salt of N-phosphonomethylimino diacetic acid
8. Di(dimethylammonium) salt of N-phosphonomethylimino diacetic acid
9. Tri(potassium) salt of N-phosphonomethylimino diacetic acid
10. Di(isopropylammonium) salt of N-phosphonomethylimino diacetic acid.

When these compounds were applied at a rate of 4 lbs/acre, grass growth with all but compound 2 was found to be at least 25 percent less than the growth of the untreated control. At this rate, moderate leaf burn was noted with compound 7, and slight leaf burn was noted with compounds 1, 6, 8, 9 and 10. When the rate was reduced to 2 lbs/acre, all but compounds 2 and 5 produced at least 25 percent less growth than said controls, and only slight leaf burn was noted with compounds 8 and 9. With the rate further reduced to 0.8 lbs/acre in this test, the above percentage of growth reduction was not noted with any compound.

In a similar test, compounds 1 and 2 were applied to K-31 fescue which had been grown in pots for about 4 weeks, and results were observed two weeks after treatment. With compound 1 at 4, 6 and 8 lbs/acre, and compound 2 at each of the first two rates, the growth of the treated grass was at least 25 percent less than the untreated control. On this same 4-week old grass, compound 3 at 0.5 lbs/acre produced the above percentage of height reduction, while compounds 4 and 5 at the same rate did not.

From the illustrative data presented in the foregoing examples of individual compounds of this invention on a variety of turfgrass species, it should be clear that selection of an appropriate rate of application to obtain the desired effects on grass height and seedhead suppression will be dependent upon several factors. As well understood by those skilled in the art, such factors include the variety of turfgrass, the stage of grass maturity, and the nature and location of the area to be treated. In general, it has been found that desired results can be obtained at application rates of from about 0.5 to about 10.0 lbs/acre. It has further been found to be preferred to employ the compounds of the invention at rates of from about 1.0 to about 6.0 lbs/acre.

The growth regulating compositions of this invention, including concentrates which require dilution prior to application to the plants, contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, pellets, solutions, dispersions or emulsions. Thus, the active ingredient can be used with an adjuvant such as a finely-divided solid, a liquid of organic origin, water, a wetting agent, a dispersing agent, an emulsifying agent or any suitable combination of these. From the viewpoint of economy any convenience, water is the preferred diluent, particularly with the highly water-soluble salts such as the alkali metal salts and ammonium salts. With these derivatives, solutions containing as high as five pounds or more of active materials per gallon can be readily prepared.

The growth regulating compositions of this invention, particularly liquids and soluble powders, preferably contain as a conditioning agent one or more surface-active agents in amounts sufficient to render a given composition readily dispersible in water or in oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters petroleum sulfonates, sulfonated vegetable oils, ditertiary acetylenic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) laurates.

Water-dispersible powder compositions can be made containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The water-dispersible powder of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required, from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface active agent and about 4 to 94 parts solvent, all parts being by weight based on the total weight of emulsifiable oil.

When operating in accordance with the present invention, effective growth regulating amounts of the glycines are applied directly or indirectly to the plants. The application of liquid and particulate solid growth regulating compositions can be carried out by conventional methods, e.g. power dusters, boom and hand sprayers and spray dusters.

The application of an effective growth regulating amount of the above-described compounds to the turfgrass is essential and critical to the practice of the present invention. The exact amount of active ingredient to be applied is dependent upon the grass variety and stage of development thereof, and the environmental conditions, as well as upon the specific phosphonomethylimino acetic acid or salt employed. It should be understood that the amount of active ingredient applied must be sufficient to regulate the growth of the treated turfgrass without producing a herbicidal or killing effect thereon. It is believed that those skilled in the art can readily determine from the teachings of this specification, including examples, the appropriate application rates.

Although the invention is described with respect to specific modifications, the details thereof are not to be construed as limitations except to the extent indicated in the following claims.

What is claimed is:

1. A method for retarding the growth of turfgrass which comprises applying to said turfgrass an effective, growth retarding amount of a compound selected from (a) acids of the formula

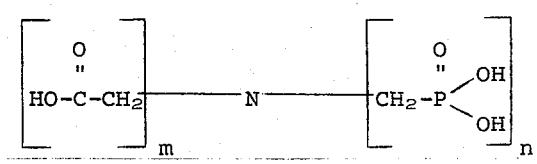

wherein $m$ and $n$ are unlike integers selected from 1 and 2, and (b) the alkali metal, ammonium and lower alkyl ammonium salts of such acids, said amount being insufficient to exert a herbicidal effect on said turfgrass.

2. A method as defined in claim 1 wherein said amount is from about 0.5 to about 10.0 lbs/acre.

3. A method as defined in claim 1 wherein said amount is from about 1.0 to about 6.0 lbs/acre.

4. A method as defined in claim 1 wherein said compound is an acid.

5. A method as defined in claim 4 wherein $m$ is 1 and $n$ is 2.

6. A method as defined in claim 4 wherein $m$ is 2 and $n$ is 1.

7. A method as defined in claim 1 wherein said compound is a salt.

8. A method as defined in claim 7 wherein said salt is an ammonium salt.

9. A method as defined in claim 8 wherein $m$ is 1 and $n$ is 2.

10. A method as defined in claim 8 wherein $m$ is 2 and $n$ is 1.

11. A method as defined in claim 1 wherein said compound is selected from said acids and the ammonium salts thereof.

12. A method as defined in claim 11 wherein said amount is from about 1.0 to about 6.0 lbs/acre.

13. A method of treating turfgrass to reduce seed-head formation which comprises applying to said turfgrass an effective amount of a compound selected from (a) acids of the formula

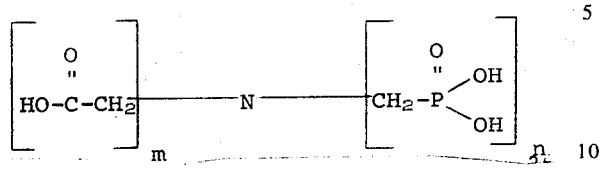

wherein $m$ and $n$ are unlike integers selected from 1 and 2, and (b) the alkali metal, ammonium and lower alkyl ammonium salts of such acids, said amount being insufficient to exert a herbicidal effect on said turfgrass.

14. A method as defined in claim 13 wherein said amount is from about 0.5 to about 10.0 lbs/acre.

15. A method as defined in claim 13 wherein said amount is from about 1.0 to about 6.0 lbs/acre.

16. A method as defined in claim 13 wherein said compound is an acid.

17. A method as defined in claim 16 wherein $m$ is 1 and $n$ is 2.

18. A method as defined in claim 16 wherein $m$ is 2 and $n$ is 1.

19. A method as defined in claim 13 wherein said compound is a salt.

20. A method as defined in claim 19 wherein said salt is an ammonium salt.

21. A method as defined in claim 20 wherein $m$ is 1 and $n$ is 2.

22. A method as defined in claim 20 wherein $m$ is 2 and $n$ is 1.

23. A method as defined in claim 13 wherein said compound is selected from said acids and the ammonium salts thereof.

24. A method as defined in claim 23 wherein said amount is from about 1.0 to about 6.0 lbs/acre.

25. A method of treating turfgrass to reduce seed-head stalk elongation which comprises applying to said turfgrass an effective amount of a compound selected from (a) acids of the formula

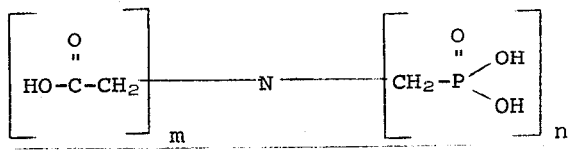

wherein $m$ and $n$ are unlike integers selected from 1 and 2, and (b) the alkali metal, ammonium and lower alkyl ammonium salts of such acids, said amount being insufficient to exert a herbicidal effect on said turfgrass.

26. A method as defined in claim 25 wherein said compound is an acid.

27. A method as defined in claim 26 wherein $m$ is 1 and $n$ is 2.

28. A method as defined in claim 26 wherein $m$ is 2 and $n$ is 1.

29. A method as defined in claim 25 wherein said compound is a salt.

30. A method as defined in claim 29 wherein said salt is an ammonium salt.

31. A method as defined in claim 30 wherein $m$ is 1 and $n$ is 2.

32. A method as defined in claim 30 wherein $m$ is 2 and $n$ is 1.

* * * * *